May 26, 1964  R. W. KREBS  3,134,734
SEPARATING APPARATUS
Filed Aug. 26, 1960  2 Sheets-Sheet 1

INVENTOR.
Richard W. Krebs.
BY
ATTORNEYS

May 26, 1964   R. W. KREBS   3,134,734
SEPARATING APPARATUS
Filed Aug. 26, 1960   2 Sheets-Sheet 2
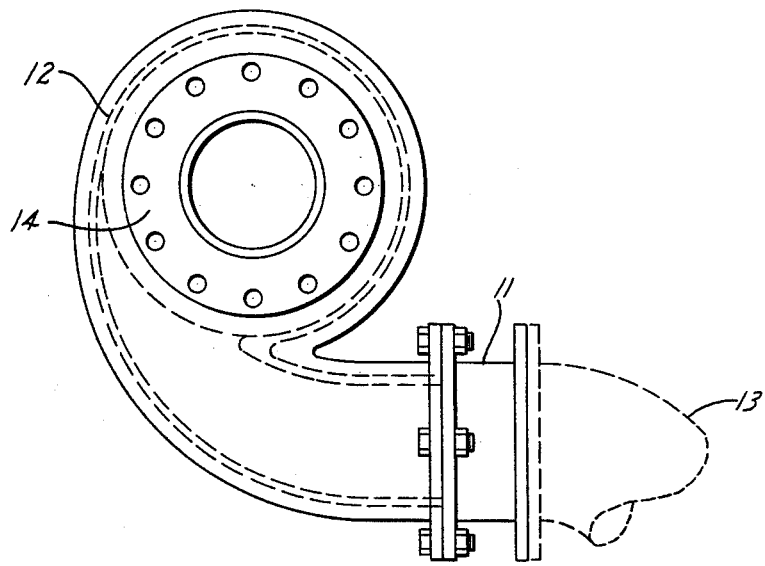
FIG_2_
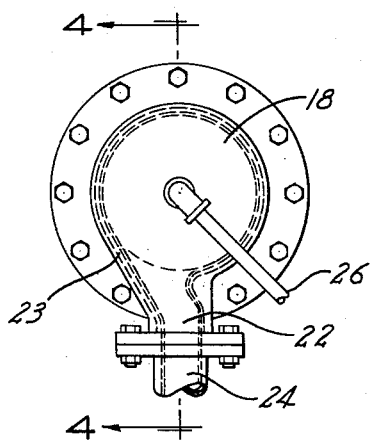
FIG_3_
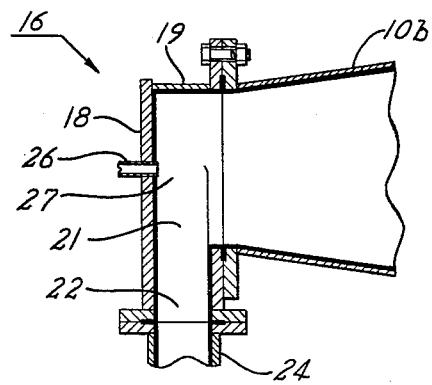
FIG_4_
INVENTOR.
Richard W. Krebs
BY
ATTORNEYS 3,134,734
SEPARATING APPARATUS
Richard W. Krebs, Palo Alto, Calif., assignor to Equipment Engineers, Inc., Palo Alto, Calif., a corporation of California
Filed Aug. 26, 1960, Ser. No. 52,288
1 Claim. (Cl. 210—257)

This invention relates generally to apparatus for separating solids from fluid feeds.

In the past, equipment of the hydro-cyclone type has been used for various separating operations, as for example for the removal of sand and silt from water. In general hydro-cyclones employ a stationary separating shell having a tangential inlet at one end for receiving the feed material. An overflow outlet is provided which communicates with a region at the central axis of the shell. That portion of the shell extending to the other end thereof is conical, and the separated solids are removed from an axial opening in the small end of the conical section, and delivered into a settling pot or tank. Swirling movement in the shell tends to extend into the settling pot, and if sufficiently intense, results in serious erosion. Such induced swirling in the settling tank is minimized by reducing the diameter of the axial underflow opening. Although this expedient is used in commerical equipment it has the disadvantage that the small underflow opening is subject to clogging or plugging by underflow solids.

In general it is an object of the invention to provide a novel separating apparatus of hydro-cyclone type, which makes possible a relatively large underflow opening without inducing swirling in the settling tank.

Another object of the invention is to provide a novel separating apparatus which is effective to remove solids over a wide range of particle size.

A further object of the invention is to provide a novel separating apparatus which is capable of better and more consistent performance than conventional hydro-cyclones.

Additional objects and features of the invention will appear from the following description in which the preferred embodiment has been set forth in detail in conjunction with the accompanying drawings.

Referring to the drawings:

FIGURE 3 is an end view taken as indicated by the line 3—3 of FIGURE 1;

FIGURE 4 is a cross sectional view taken along the line 4—4 of FIGURE 3, and

FIGURE 5 is a detail in side elevation showing another embodiment in which the separating shell is vertical.

Figure 1:
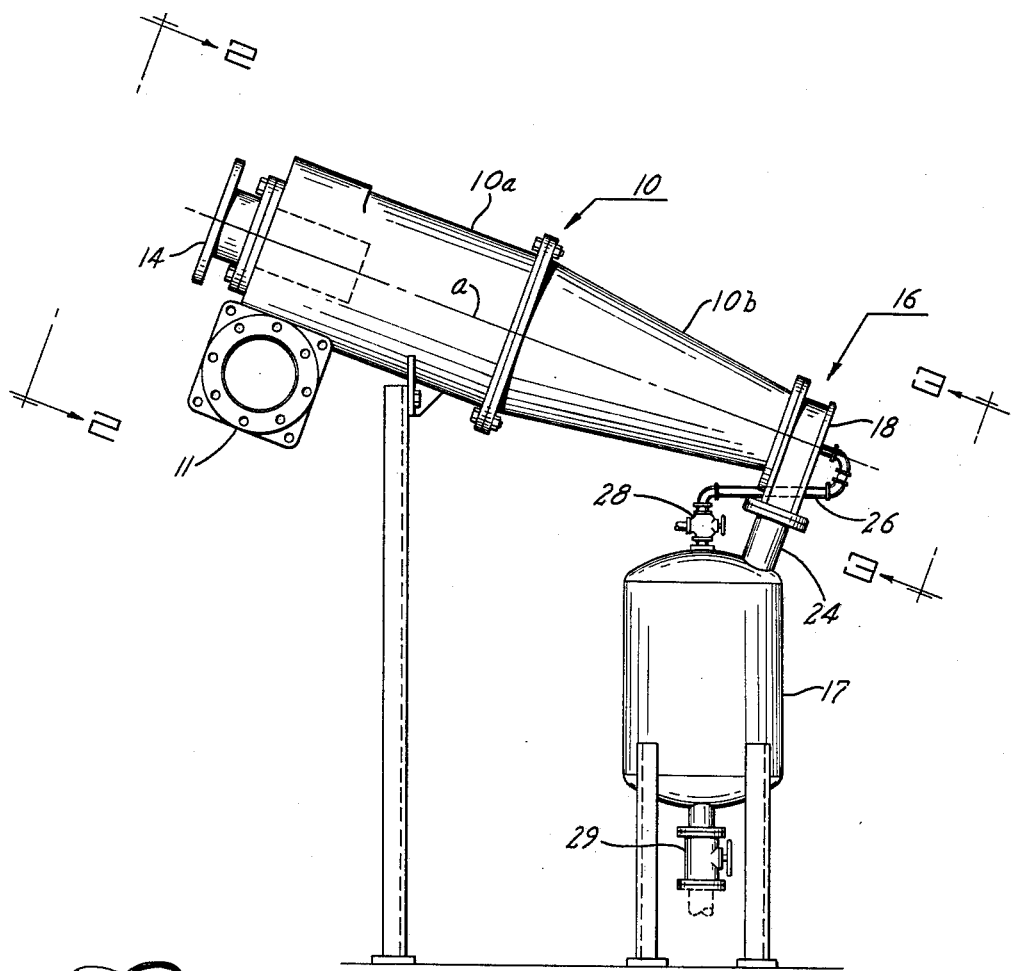
FIGURE 1 is a side elevational view illustrating separating apparatus incorporating the present invention.
Figure 2:
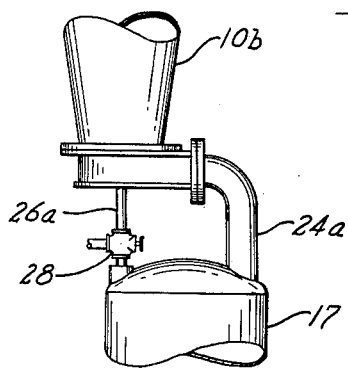
FIGURE 2 is an end view taken as indicated by the line 2—2 of FIGURE 1.

My method can best be understood after an explanation of the apparatus illustrated in the drawings. It consists of a stationary shell 10 which is circular in section, and which as illustrated is disposed with its axis generally horizontal. Preferably the shell is formed in two sections, namely section 10a which is substantially cylindrical, and section 10b which is conical.

Fluid feed is shown being introduced into the shell 10 by way of the inlet conduit 11, which communicates with one end of the shell through the involute section 12. This involute section may be a part of the shell section 10a. A pipe or conduit 13 is shown coupled to conduit 11, and connects with a pump or system which supplies the feed material at a pressure head sufficient for proper operation.

Liquid overflow is removed from the shell by the outlet conduit or vortex finder 14, which communicates with a central region of the shell, namely a region at the axis $a$ and near that end of the shell corresponding to the inlet conduit 11. The exterior end of the conduit 14 may be coupled to piping for delivering the overflow liquid where it is desired, as for example to a receiving tank.

At the small end of the shell 10, there is a means 16 for removing solids and for delivering the same into the collection tank 17. As shown particularly in FIGURES 3 and 4, the means 16 includes the end wall 18, and the curved circumferential wall 19. The wall 19 is formed generally to a diameter corresponding to the diameter of the adjacent small end of the conical section 10b. At one side of this structure, the inner space 21 communicates with the passage 22, which as illustrated in FIGURE 4, extends in a general downward direction. As shown in FIGURE 3, the wall portion 23 extends tangentially to the opening 22, whereby centrifugally separated solids which are delivered to the inner surface of the wall 19, are caused to be moved tangentially to the opening 22. Pipe 24 is shown coupled to the opening 22, and extends downwardly to the top of the collecting tank 17, where it communicates with the upper portion of this tank through the top cover.

A bleed connection is provided between the collecting tank 17 and the interior of the shell 10. Thus a bleed pipe 26 has its one end communicating through the cover of the collecting tank 17, and its other end connected through the wall 18, whereby it communicates with a region 27 within the solids removal means 16, and at the axis $a$. Pipe 26 may be provided with a suitable valve 28 for controlling the flow through the same, and for occasionally taking out a sample, as indicated. A valve control pipe 29 connects with the bottom of the collecting pot 17, and may be opened as desired for removal of collected solids.

The walls of the shell and of the volute and solids removal sections 12 and 16, may be lined with a layer of rubber as indicated, the minimize erosion.

Operation of the equipment described above, and the manner in which my method is carried out in practice, is as follows: Assuming that it is desired to remove sand and silt from water, the inlet conduit 11 is connected to a source of feed, such as a water pipe, to which water is being supplied by gravity or pumping means at a relatively uniform pressure head. Continuous flow of feed into the involute section 12 causes the liquid body within the shell 10 to rotate about its longitudinal axis. Centrifugal separating forces cause the solids to move outwardly to the side walls of the shell, and to gradually progress to the small end of the conical section 10b. A continuous overflow is established and maintained through the overflow conduit 14. Rotary movement of the body of material within the shell induces rotary movement within the solids discharge section 16, and as the solids progress into this section, they are caused to move downwardly along the wall portion 23, into the outlet opening 22, and thence downwardly into the upper end of the collecting tank 17. Within the collecting tank the solids settle by gravity in a quiescent body of liquid. There is a small differential pressure between the upper interior portion of tank 17, and the region 27 with which the bleed pipe 26 communicates. By virtue of this pressure differential, a continuous flow occurs through the pipe 26, namely from the upper portion of pot 17, back into the solids discharge section 16. Such continuous return of a small amount of liquid causes a sufficient movement of liquid through the opening 22 and the pipe 24, to cause separated solids to be effectively carried into the collecting pot.

The present invention is well adapted to installations where the shell 10 is disposed in a generally horizontal position. It is desirable for the shell to be inclined somewhat to the horizontal, whereby the lower side of the conical section 10b is slightly inclined to insure drainage of liquid to the lower or righthand end as viewed in FIGURE 1. Thus with the proportions illustrated in FIGURE 1, the axis of the shell can be at an angle of say 15 to 20° to the horizontal.

While operation in a horizontal position is desirable in many installations, the separating shell 10 may be disposed vertical as shown in FIGURE 5. In this instance pipe 24a is bent to deliver underflow solids into the tank 17, and pipe 26a communicates between the tank and the shell in the same manner as pipe 26 of FIGURE 1.

Examples of my invention are as follows:

*Example 1*

The apparatus employed was a laboratory version of the apparatus described above. The shell 10 had its axis at an angle of 15° to the horizontal. The fluid feed employed was a mixture of sand and slime in water. The particle size of the solids in the mixture ranged from 1 micron to 150 microns. The differential between the pressure applied to the inlet conduit 11, and the outlet conduit 14, was about 10 p.s.i., which afforded a flow of about 100 gallons per minute. Of the solids contained in the feed, 99.99% were recovered in the tank 17. The overflow water was essentially free of all solid particles. The particle size distribution of the sand collected in the tank 17 was as follows.

| Micron size: | Percent weight |
|---|---|
| 150 to 210 | 30.9 |
| 105 to 150 | 21.6 |
| 74 to 105 | 22.6 |
| 53 to 74 | 15.4 |
| 43 to 53 | 5.2 |
| 37 to 43 | 2.6 |
| 0 to 37 | 1.7 |
| | 100.0 |

The above example demonstrated that my apparatus method is capable of highly efficient separation of sand and slime solids from water, and that the separation is effective for relatively small sized particles, including particles ranging down to 1 micron.

*Example 2*

The apparatus was the same laboratory unit used in Example 1. The inlet was fitted with an orifice having an area of 2.2 square inches and a vortex finder 2.5 inch inside diameter. A differential pressure of 14 p.s.i. was maintained during the course of the test. With these orifices and this differential pressure, flow rate through the unit was approximately 110 g.p.m. The feed was a mixture of sand and slime in water. The particle size distribution of the solids in the feed mixture was as follows.

| Micron size: | Percent weight |
|---|---|
| 150 to 210 | 41.5 |
| 105 to 150 | 26.2 |
| 74 to 105 | 19.5 |
| 53 to 74 | 9.1 |
| 43 to 53 | 2.0 |
| 37 to 43 | 0.7 |
| 1 to 37 | 1.0 |
| | 100.0 |

The feed was prepared as a batch containing 415.5 grams of solids mixed in 50 gallons of water.

The total weight of solids recovered in the sand accumulation tank was 415.49 grams. A pressure filter was applied to remove solids in the overflow. The weight of solids thus recovered was 0.01 gram.

The results of this test showed that more than 99.99% of the solids in the feed mixture were removed by means of the unit, and the overflow product of the unit was essentially free of all solid particles.

*Example 3*

The apparatus used was generally the same as in Examples 1 and 2, but the shell 10 was mounted in a vertical position as in FIGURE 5. The inlet was fitted with a 2.2 square inch inlet orifice and a 2.5 inch diameter vortex finder. A differential pressure of 14 p.s.i. was maintained during the course of the test. With these orifices and this differential pressure, flow rate through the unit was approximately 110 g.p.m.

The feed mixture comprised 316.9 grams of solids mixed with 50 gallons of water. Particle size distribution of the solids was as follows:

| Micron size: | Percent weight |
|---|---|
| 150 to 210 | 43.1 |
| 105 to 150 | 24.9 |
| 74 to 105 | 19.3 |
| 53 to 74 | 8.8 |
| 43 to 53 | 2.0 |
| 37 to 43 | 0.8 |
| 1 to 37 | 1.1 |
| | 100.0 |

The weight of solids recovered in the sand accumulator tank was 316.70 grams. The weight of solids recovered in the pressure filter on the overflow line was 0.12 gram.

The results of this test showed that more than 99.93% of the solids in the feed mixture were removed.

A feature of the invention is that swirl does not extend into the tank 17, but on the contrary the liquid in this tank is quiescent. Therefore no erosion takes place such as is commonly experienced with conventional hydrocyclones. The body of liquid in tank 17 remains quiescent in spite of the fact that the opening from the shell into the tank (pipe 24) may be relatively large. By way of comparison, in a typical instance my apparatus may have an effective underflow outlet with a cross sectional flow area of 4.5 square inches, whereas a comparable conventional hydrocyclone would have an axial underflow opening of about 0.78 square inch. The large underflow transfer opening which characterizes my apparatus minimizes the possibility of clogging or plugging, and makes for more effective transfer of the solids. The absence of swirling movement in tank 17 is attributed to the fact that the communication with pipe 22 is with a peripheral portion of the conical section 10b, whereby the energy of the swirling material in the shell is not effectively transferred to the body of liquid in tank 17.

It will be evident from the foregoing that my apparatus and method affords efficient separation and removal of solids over a wide range of particle sizes.

I claim:

Apparatus for separating solid particles from liquids containing the same, comprising a shell substantially filled with a body of liquid, said shell being circular in cross-section and having a conically shaped portion of gradually decreasing diameter terminating adjacent to one end of said shell, the other end of said shell having a tangential inlet and means for delivering a stream of said solid-containing liquid into said shell through said inlet to cause the body of liquid contained therein to rotate thereby producing centrifugal forces which cause the solids to separate and progress to the walls of said shell along which they travel in a helical path toward said one end of said shell; an axially disposed conduit entering said other end of said shell to find the vortex of the rotating body of liquid and discharge overflow liquid from said shell; a collection tank substantially filled with a quiescent body of liquid and disposed below said one end of said shell, said one end of said shell having a tangential outlet for discharging the solids from said shell with a minimum of liquid flow, pipe means extending downwardly from said tangential outlet and having one end thereof connected to said tangential outlet, the other end of said pipe means being connected to the upper portion of said collection tank to deliver said solids to said body of quiescent liquid in said collection tank without transmitting the rotational movement of said body of liquid in said shell to the quiescent body of liquid in said collection tank; and a conduit having its one end connected to the upper end of said collection tank and its other end connected to said one end of said shell at the axis of said shell whereby liquid in said collection tank displaced by entering solids is delivered into said shell and discharged with said overflow.

References Cited in the file of this patent

UNITED STATES PATENTS

| | | |
|---|---|---|
| 2,379,411 | Berges | July 3, 1945 |
| 2,709,397 | Banning | May 31, 1955 |
| 2,870,908 | Fitch | Jan. 27, 1959 |
| 2,965,522 | Crespin et al. | Dec. 20, 1960 |
| 3,003,347 | Morris et al. | Oct. 10, 1961 |

FOREIGN PATENTS

| | | |
|---|---|---|
| 720,465 | Great Britain | Dec. 22, 1954 |